United States Patent [19]
Tomita et al.

[11] Patent Number: 5,493,424
[45] Date of Patent: Feb. 20, 1996

[54] IMAGE FORMING APPARATUS

[75] Inventors: Kan Tomita; Toshihiko Majima, both of Tokyo, Japan

[73] Assignee: Ricoh Company, Ltd., Tokyo, Japan

[21] Appl. No.: 235,191

[22] Filed: Apr. 29, 1994

Related U.S. Application Data

[63] Continuation of Ser. No. 981,005, Nov. 20, 1992, abandoned.

[30] Foreign Application Priority Data

Nov. 21, 1991 [JP] Japan ................... 3-332478

[51] Int. Cl.$^6$ ............... H04N 1/26; H04N 1/40
[52] U.S. Cl. ............ 358/500; 358/523; 358/538; 358/524; 358/448; 358/453
[58] Field of Search ............ 358/448, 451, 358/452, 453, 401, 501, 524, 537, 538, 523

[56] References Cited

U.S. PATENT DOCUMENTS

| | | | |
|---|---|---|---|
| 4,937,662 | 6/1990 | Matsunaw et al. | 358/75 |
| 4,987,497 | 1/1991 | Yoshimura | 358/452 |
| 5,016,096 | 5/1991 | Matsunawa et al. | 358/448 |
| 5,029,224 | 7/1991 | Fujisawa | 382/22 |
| 5,075,787 | 12/1991 | Shaughnessy et al. | 358/452 |
| 5,138,465 | 8/1992 | Ng et al. | 358/448 |

FOREIGN PATENT DOCUMENTS

| | | | |
|---|---|---|---|
| 0357407 | 3/1990 | European Pat. Off. | H04N 1/387 |
| 2109192 | 5/1983 | United Kingdom | H04N 1/02 |
| 2173665 | 10/1986 | United Kingdom | H04N 1/38 |
| 2203014 | 10/1988 | United Kingdom | H04N 1/387 |
| 2213344 | 8/1989 | United Kingdom | H04N 1/387 |
| 2246263 | 1/1992 | United Kingdom | G03G 15/00 |

Primary Examiner—Edward L. Coles, Sr.
Assistant Examiner—Thomas D. Lee
Attorney, Agent, or Firm—Cooper & Dunham

[57] ABSTRACT

An image forming apparatus capable of identifying a color or colors which may be entered on a document. The apparatus automatically manipulates an image representative of a document only if the document is marked in any desired color. With the apparatus of the invention, the image forming time is reduced, and the image forming procedure is simplified.

10 Claims, 17 Drawing Sheets

Fig. 10
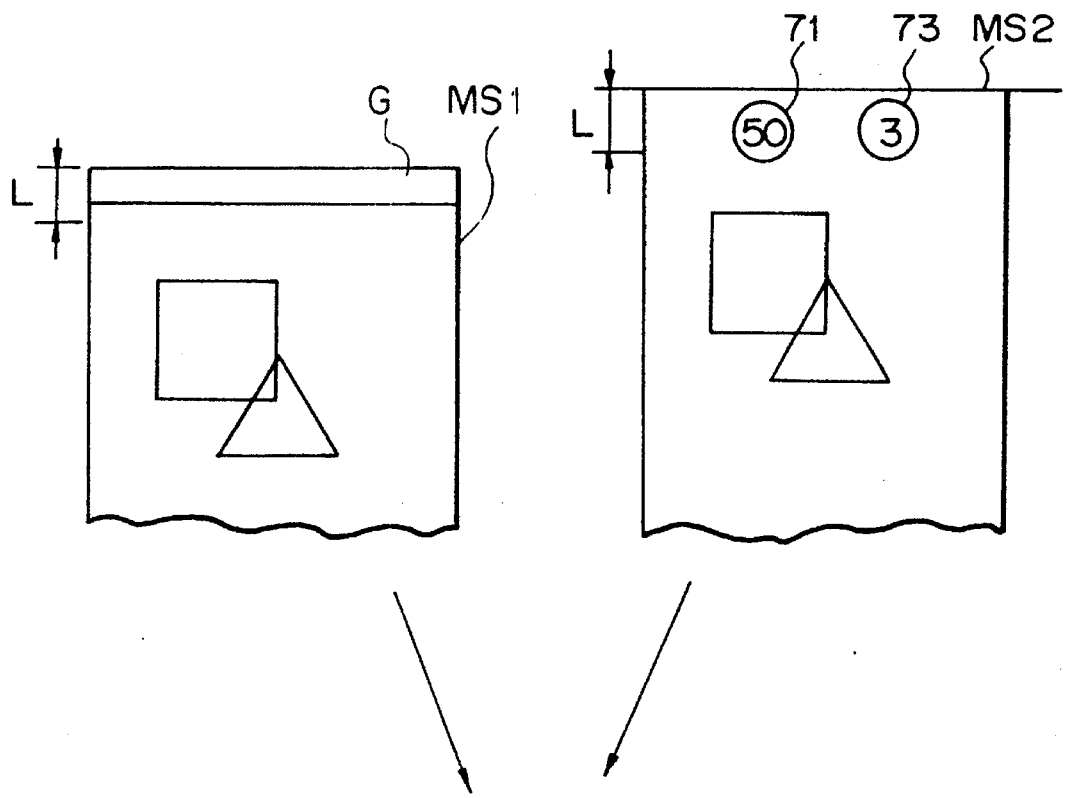
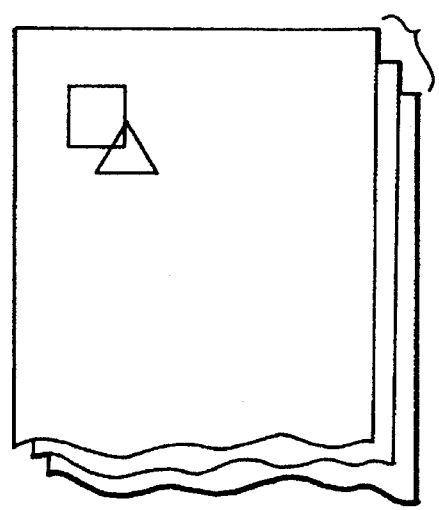

Fig.12A

ORDINARY
- RED : ERASE INSIDE
- GREEN : ERASE OUTSIDE PLUS CORNERING
- BLUE : MESH INSIDE (DOT MESH)

Fig.12B

MAGNIFICATION CHANGE
- RED LEAD EDGE : 200 %
- GREEN LEAD EDGE : 141 %
- BLUE LEAD EDGE : 50 %

Fig.12C

MESH
- RED : SLASH MESH INSIDE
- BLUE : DOT MESH INSIDE
- GREEN : HORIZONTAL LINE MESH INSIDE

Fig.12D

LEAD EDGE COLOR
- LEAD EDGE RED NUMERAL : MAGNIFICATION
- LEAD EDGE BLUE NUMERAL : NUMBER OF COPIES
- BLUE LEAD EDGE : TWO-SIDED TO TWO-SIDED COPY

| COLOR NO. | COLOR | FUNCTION |
|---|---|---|
| ↑ | LIGHT RED | ERASE INSIDE |

IMAGE FORMING APPARATUS

This is a continuation of application Ser. No. 07/981,005, filed Nov. 20, 1992, abandoned.

BACKGROUND OF THE INVENTION

The present invention relates to an image forming apparatus and more particularly, to an image forming apparatus capable of discriminating colors existing on a document.

A variety of multifunction image forming apparatuses are available today. For example, a digital copier is known which is capable of not reproducing an image existing at the outside or inside of a mark entered on a document by a monocolor marker, meshing, coloring or changing the color of one of the two regions divided by the mark, or otherwise manipulating an image. However, this type of conventional digital copier has various problems left unsolved, as follows. To begin with, only a single kind of processing is practicable with the inside or the outside of the color mark, i.e., a plurality of kinds of processing cannot be effected by a single output. Further, the color of the marker is specified and cannot be replaced with another in the event of manipulation. In addition, since the processing functions cannot be selected unless keys are operated in a complicated manner, they are rarely used despite that various copying functions are available with the copier or, even if used, need complicated key operations which increase the copying time.

SUMMARY OF THE INVENTION

It is, therefore, an object of the present invention to provide an image forming apparatus capable of manipulating an image only if a document is marked in a desired color, and reducing the imaging forming time and simplifying the image forming procedure.

In accordance with the present invention, an image forming apparatus comprises a reading section for optically reading a document, an image forming section for forming an image representative of the document read by the reading section on an image carrier in response to image data, a storing section for storing desired colors and functions associated with the colors and relating to image formation, an identifying section for identifying a color entered on the document in response to the image data, and a control section for executing any of the functions stored in the storing section and matching the color determined by the identifying section.

Also, in accordance with the present invention, an image forming apparatus comprises a mode setting section for setting a mode associated with various functions relating to image formation, a reading section for optically reading a document, an image forming section for forming an image representative of the document read by the reading section on a recording medium in response to image data and in the mode set by the mode setting means, a storing section for storing, for each of the modes set by the mode setting means, desired colors and functions relating to image formation and corresponding to the desired colors, an identifying section for identifying a color entered on a document in response to image data generated by the reading section, and a control section for executing the functions stored in the storing section in matching relation to the color identified by the identifying section and the mode set by the mode setting section.

BRIEF DESCRIPTION OF THE DRAWINGS

The above and other objects, features and advantages of the present invention will become more apparent from the following detailed description taken with the accompanying drawings in which:

FIG. 10 demonstrates another specific operation of the embodiment;

FIGS. 12A–12D show specific functions assigned to each color in each mode available with the embodiment;

DESCRIPTION OF THE PREFERRED EMBODIMENT

Figure 1:
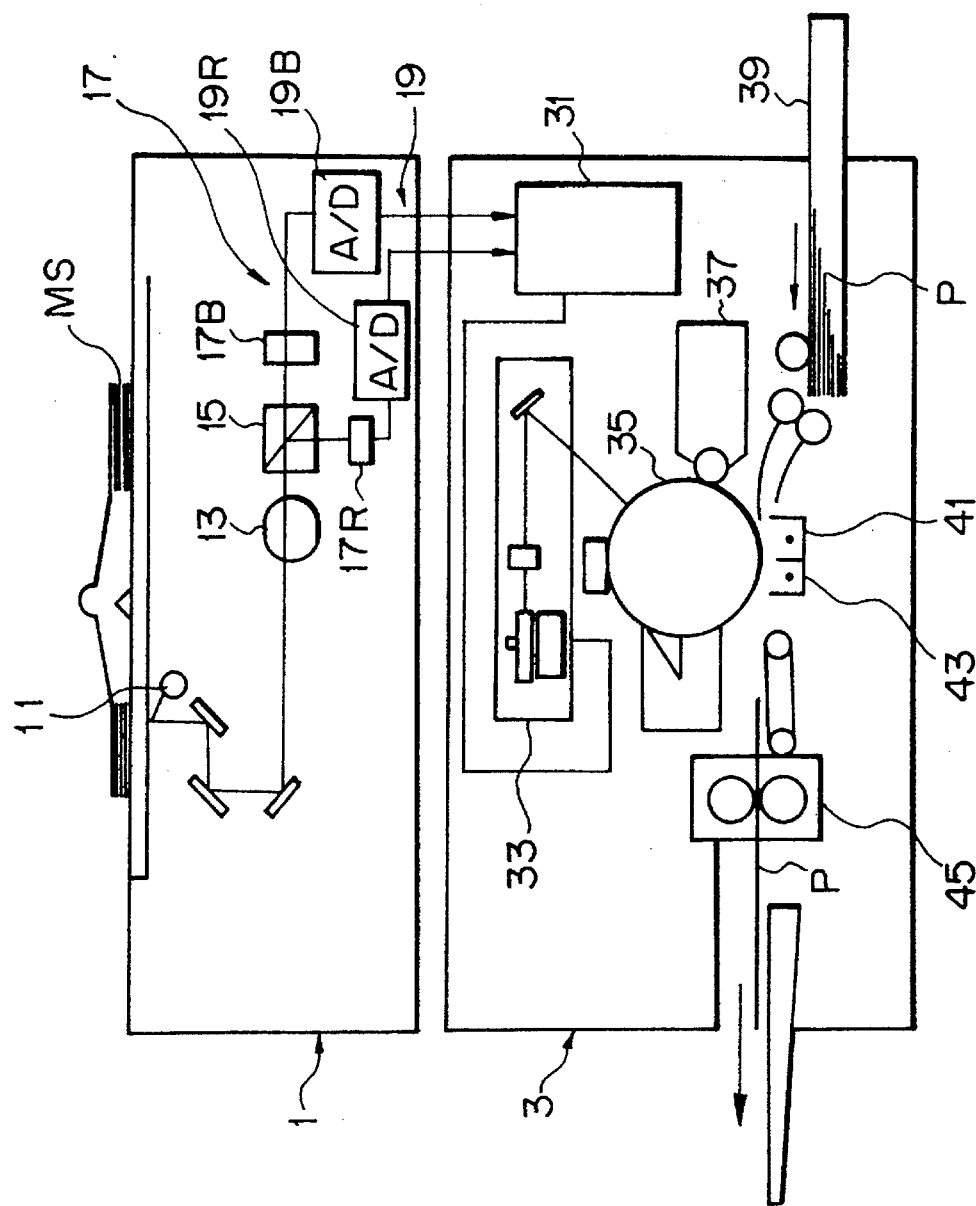
FIG. 1 is a section showing an image forming apparatus embodying the present invention and implemented as a digital copier by way of example.

Referring to FIG. 1 of the drawings, a digital copier representative of an image forming apparatus embodying the present invention is shown. As shown, the copier is generally made up of a scanner section 1 and a printer section 3. The scanner section 3 includes, for example, a scanner loaded with a reflector, a light source 11 and mirrors and movable at a predetermined speed. As the scanner optically scans a document MS laid on a glass platen, the resulting reflection from the document MS is routed through a lens 13 and a dichroic prism 15 to be incident on a CCD (Charge Coupled Device) image sensor or similar solid state imaging device 17. While the light source 11 may be implemented by a fluorescent lamp or a halogen lamp, a fluorescent lamp is predominant due to stable wavelength and long life particular thereto. Although a single light source 11 with a reflector is shown in the figure, two or more light sources may be used, if necessary. Since the CCD image sensor 17 has a predetermined sampling clock, the fluorescent lamp would adversely effect images if it were not turned on at a frequency higher than the sampling frequency. The analog image signal from the CCD image sensor 17 is digitized by an analog-to-digital converter (ADC) 19. The resulting digital image signal is applied to a signal processor 31 to undergo various kinds of image processing (e.g. conversion to two levels or multiple levels, tone processing, magnification change, and editing). As a result, a digital signal in the form of a set of spots appears on the output of the signal processor 31.

Figure 2:
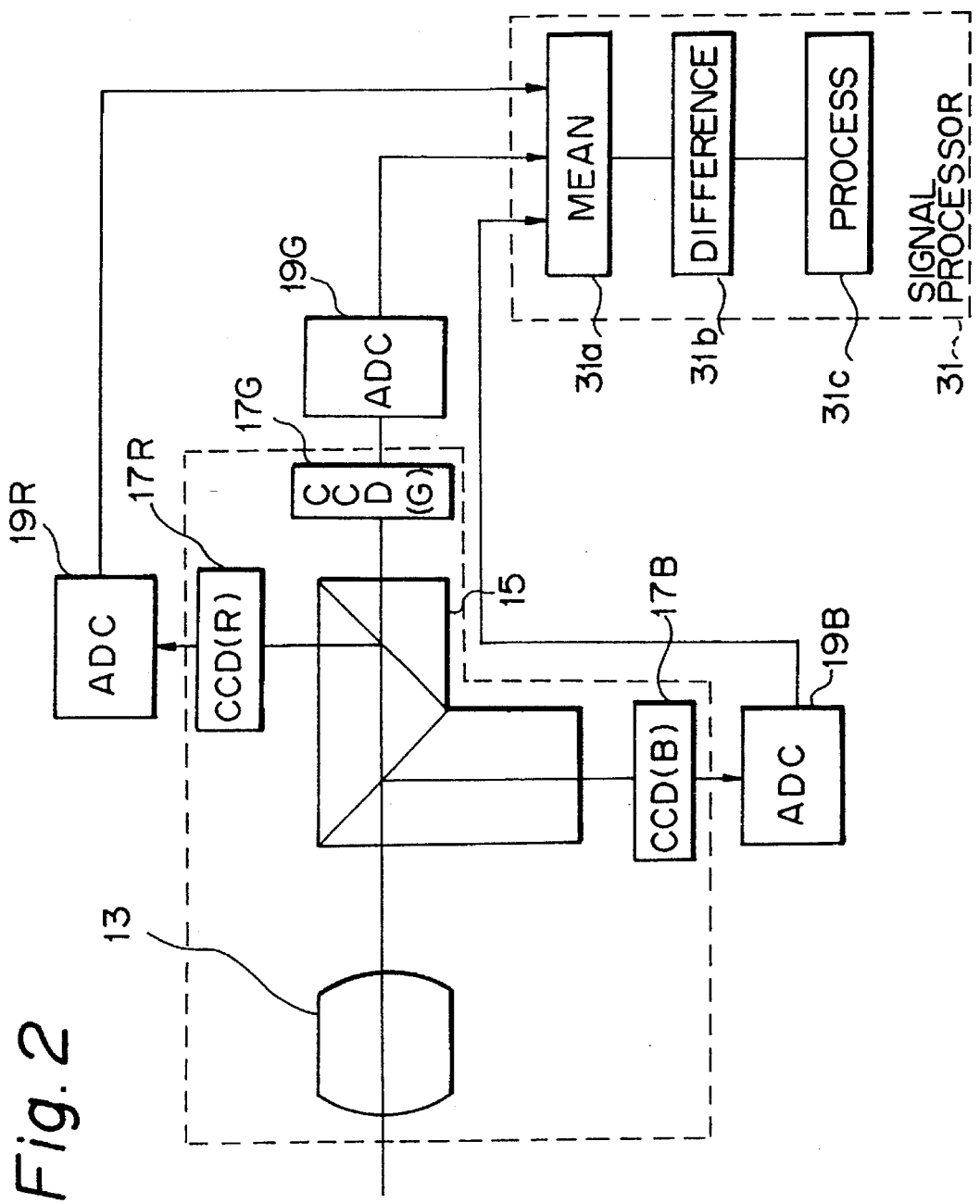
FIG. 2 is a block diagram schematically showing a dichroic prism included in the embodiment together with the neighborhood thereof.
Figure 3:
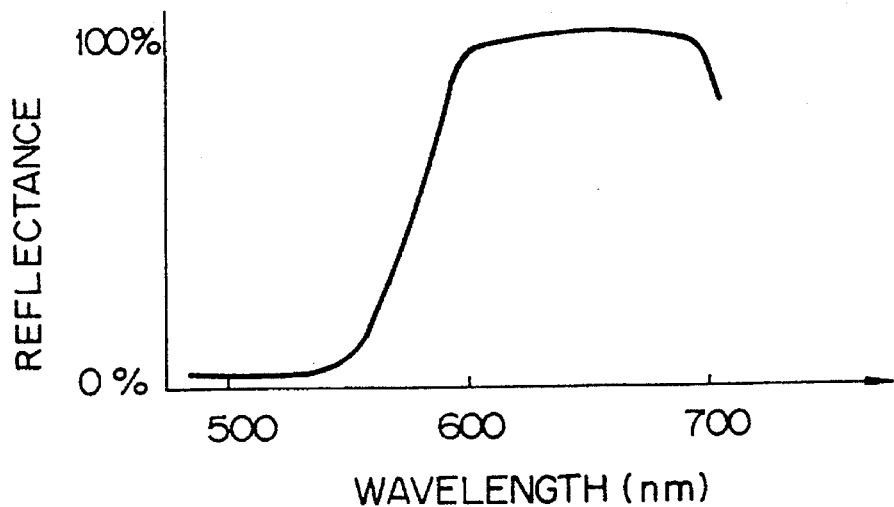
FIG. 3 plots a relation between the reflectance of the dichroic mirror and the wavelength.

To produce color image data, the embodiment uses the dichroic prism 15 and two or three CCD arrays 17R, 17G, FIG. 2, and 17B. Specifically, as shown in FIG. 1, the dichroic prism 15 is located between the lens 13 and the CCD arrays 17R and 17B. The CCD arrays 17B and 17R read respectively a signal of shorter wavelength (blue side) and a signal on the red side. More specifically, as shown in FIG. 3, the dichroic prism 15 has a reflectance of substantially 100% over a range of 600–700 nm and can selectively transmit or reflect incident light depending on the wavelength. Hence, the light lying in the range of 600–700 nm and reflected by the prism 15 is incident on the CCD array 17R while the light of 550 nm and less is transmitted through the prism 15 to be incident on the CCD array 17B. As shown in FIG. 2, an arrangement may be made such that red light, green light and blue light may be separated by a dichroic prism and read by the three CCD arrays 17R, 17G and 17B in full color. In FIG. 1, when the output levels of the CCD arrays 17R and 17B are substantially the same, the color can be determined to be white, gray or black: when the output of the CCD array 17R is more intense, the color is determined to be red while, the output of the CCD array 178B is more intense, the color is determined to be blue.

The printer section 3 includes an optical writing section for writing the processed image data on a photocoductive drum 35 as a set of light beam spots by raster scanning using a laser beam. Specifically, scanning optics 33 has a semiconductor laser, a collimating lens for collimating the beam issuing from the laser, and an aperture lens for shaping the collimated beam to provide it with a predetermined shape. The shaped beam is compressed in the subscanning direction by a first cylinder lens and then incident on a polygonal mirror. The polygonal mirror has a precise polygonal shape and is rotated by an exclusive motor at a predetermined speed in a predetermined direction. The rotation speed of the polygonal mirror is determined by the rotation speed of the drum 35, the writing density, and the number of faces of mirror. The laser beam incident on the polygonal mirror is reflected while being deflected due to the rotation of the mirror. The laser beam from the polygonal mirror is propagated through an F-theta lens so as to scan the drum 35 at a constant speed. A mechanism is provided for compensating for irregularities which may exist in the physical configuration of the polygonal mirror. The laser beam from the f-theta lens is sensed at the outside of an image forming region to set up synchronization in the main scanning direction. Specifically, on the elapse of a predetermined period of time after the generation of a synchronizing signal, one line of image data is outputted. This is repeated until one image has been completed.

The drum 35 has a photoconductive layer on the periphery thereof. In the illustrative embodiment, the photoconductive layer is made of an organic photoconductor (OPC) which belongs to a family of photoconductors sensitive to the semiconductor laser (wavelength of 780 nm). The OPC may be replaced with α-Si or Se-Te which are also known in the art. To write image data on the drum 35, a light beam may illuminate an image portion (negative-to-positive or N/P process) or illuminate the background (positive-to-positive or P/P process). The embodiment uses the N/P process.

A main charger is implemented as a scorotron charger having a grid on the drum side. The main charger uniformly charges the surface of the drum 35 to negative polarity. The laser beam illuminates the charged surface of the drum 35 to lower the potential. As a result, the background and the image portion of the drum 35 are respectively deposited with a potential of about −750 V to −800 V and a potential of about −500 V, forming an electrostatic latent image on the drum 35. A developing unit 37 has a developing roller to which a bias voltage of −500 V to −600 V is applied. The developing roller develops the latent image by depositing a negatively charged toner thereon, whereby the latent image is converted to a toner image.

The developing unit 37 is implemented as a main and an auxiliary developing unit. A toner supply unit paired with the main unit stores a black toner while a toner supply unit paired with the auxiliary unit stores a color toner. This allows selective development to be effected by, for example, changing the position of the main pole of the developing unit which does not join in the development. With the developing unit 37, it is possible to read color data, cause a paper transport system to effect multiple transfer, and perform multifunction color copying and color editing by using a two-sided copying function. When three or more colors are desired, three or more developing units may be arranged around the drum 35 or, alternatively, a revolver having three or more developing units therein may be rotated about its axis.

While a paper is fed to the drum 35 in synchronism with the rotation of the drum 35, a transfer charger 41 applies a positive charge to the paper from the rear to transfer the toner image from the drum 35 to the paper. A separation charger 43 is provided integrally with the transfer charger 41 and separates the paper carrying the toner image thereon from the drum 35 by AC discharge. The toner remaining on the drum 35 after the image transfer is scraped off by a cleaning blade and the collected in a tank. Further, the potential pattern remaining on the drum 35 is erased by a lamp. A photosensor is located downstream of the developing station and made up of a light emitting element and a light-sensitive element. The photosensor senses the reflection density of the surface of the drum 35. Specifically, the optical writing section writes a particular pattern, e.g., a black pattern or a mesh pattern on the drum 35 in a position which the photosensor can read. After the particular pattern has been developed, the photosensor senses it. As a result, the image density is determined on the basis of a ratio in reflectance between the particular pattern and the other part of the drum 35. If the image density is low, a toner supplement signal is generated. If desired, the fact that the amount of remaining toner is short may be reported when the image density does not increase despite the supplement of the toner.

A paper cassette 39 is loaded with a stack of papers P. When a start button is pressed, a pick-up roller adjoining the paper cassette 39 is rotated to feed a single paper P until it abuts against a register roller. The register roller starts rotating in synchronism with the rotation of the drum 35 to drive the paper P toward the periphery of the drum 35. By the previously stated procedure, the toner image is transferred from the drum 35 to the paper P, and then the paper P is separated from the drum 35. Subsequently, the paper P with the toner image is transported to a fixing unit 45 made up of a heat roller and a pressure roller. The fixing unit 45 fixes the toner image on the paper P by heat and pressure. Finally, the paper P is driven out of the copier.

Figure 4A:
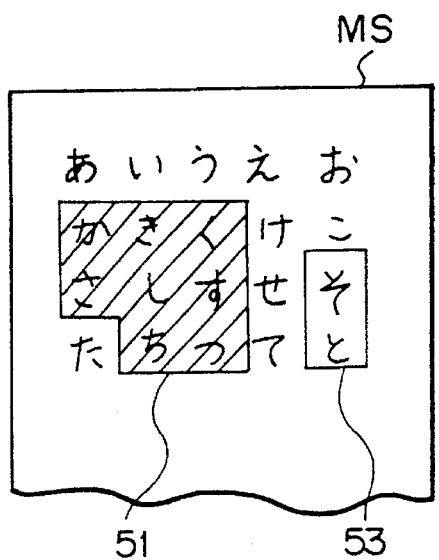
FIGS. 4A and 4B demonstrate a specific operation of the embodiment.
Figure 4B:
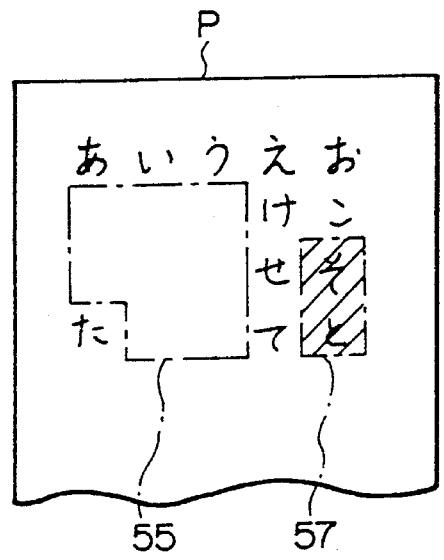

FIGS. 4A and 4B demonstrate a specific function available with the embodiment. As shown, assume that the operator has painted part 51 of the document MS with a red marker and another part 53 with a blue marker to delete the former and mesh the latter. Then the signal processor 31 selects necessary functions on the basis of the colors represented by the outputs of the scanner, FIG. 1 and then processes the image signal to be fed to the scanning optics 33. As a result, the printer section 3 produces a hard copy having an erased portion 55 and a mesh portion 57 thereon.

Figure 5:
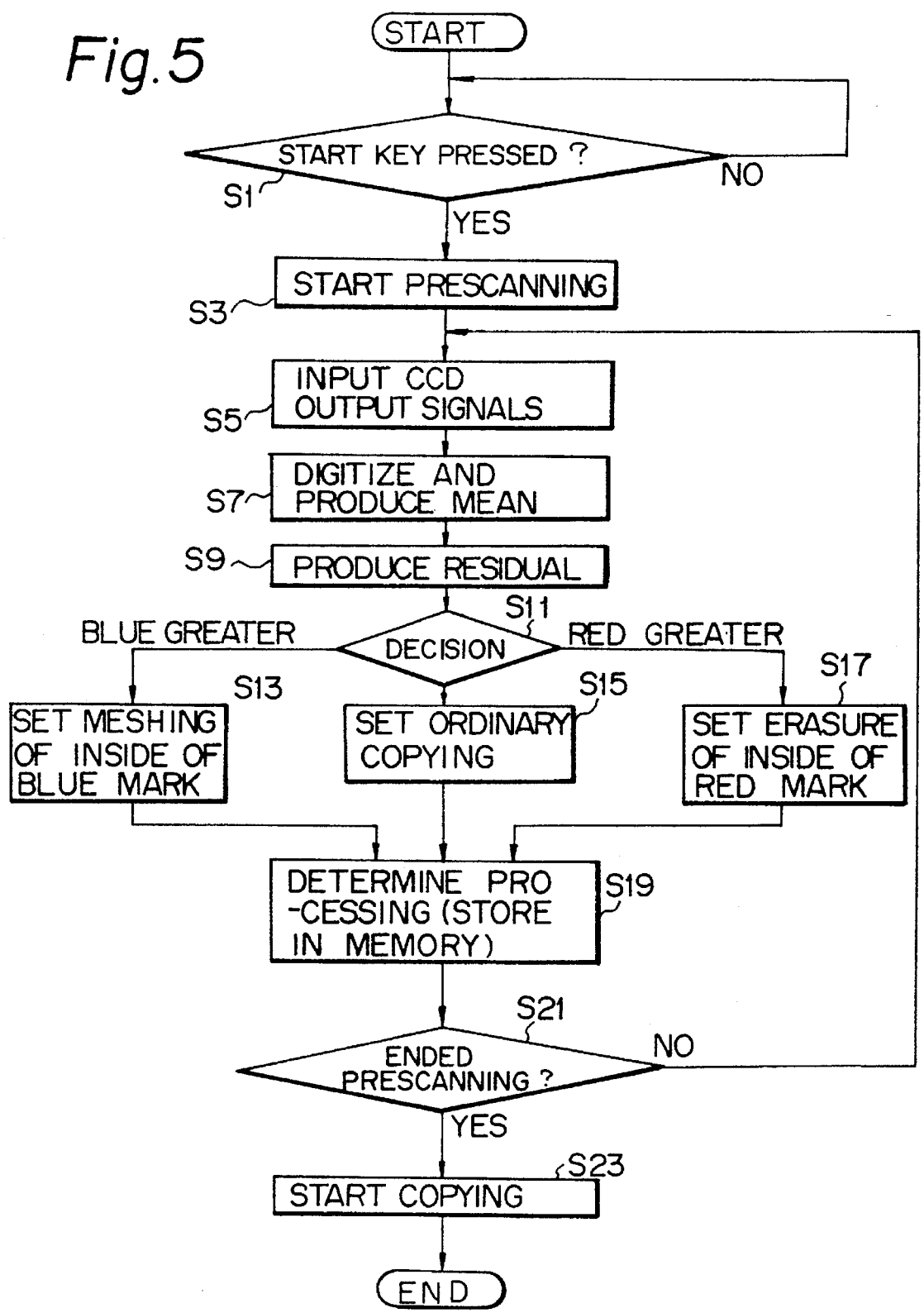
FIG. 5 is a flowchart associated with the operation of FIGS. 4A and 4B.

Specifically, as shown in FIG. 5, when the start key is pressed (step S1), the document MS is prescanned (S3) to set up copying functions matching the colors. The outputs of the CCD arrays are applied to the signal processor as digital signals (S5). A mean section produces a means of the digital signals over a predetermined area at a time in order to smooth noise (S7). Then, a difference detecting section determines a residual with each of red and blue (S9). Whether to select particular processing (S13 or S17) or to recognize the image data as an image (S15) is determined on the basis of the residual (S15). The result of decision is written into a memory (S19). Such a procedure is repeated until the processing has been determined over the entire image area by the prescanning (loop extending from S21 and returning to S21 via S5). Thereafter, a copying operation begins for executing the processing of interest (S23).

If desired, the prescanning scheme stated above may be replaced with a conventional real time processing scheme. It is to be noted that the copying functions include not only the blanking, meshing (including selection of a mesh pattern) and other image manipulations, but also magnification change, copy number setting and other conventional functions which can be entered on an operation panel.

Figure 6:
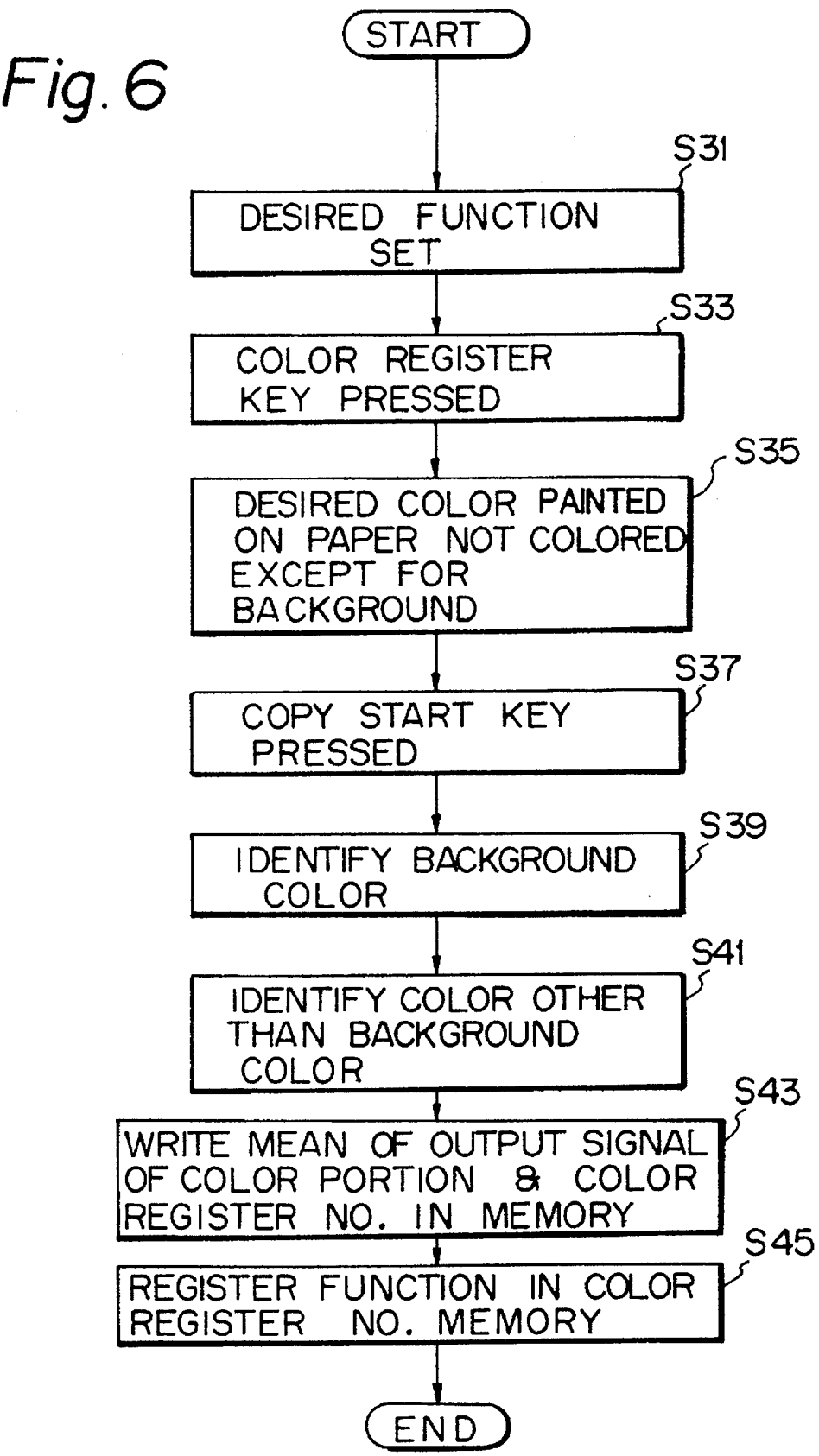
FIG. 6 is a flowchart representative of a procedure for registering a desired color and a function assigned to the color.
Figure 19:
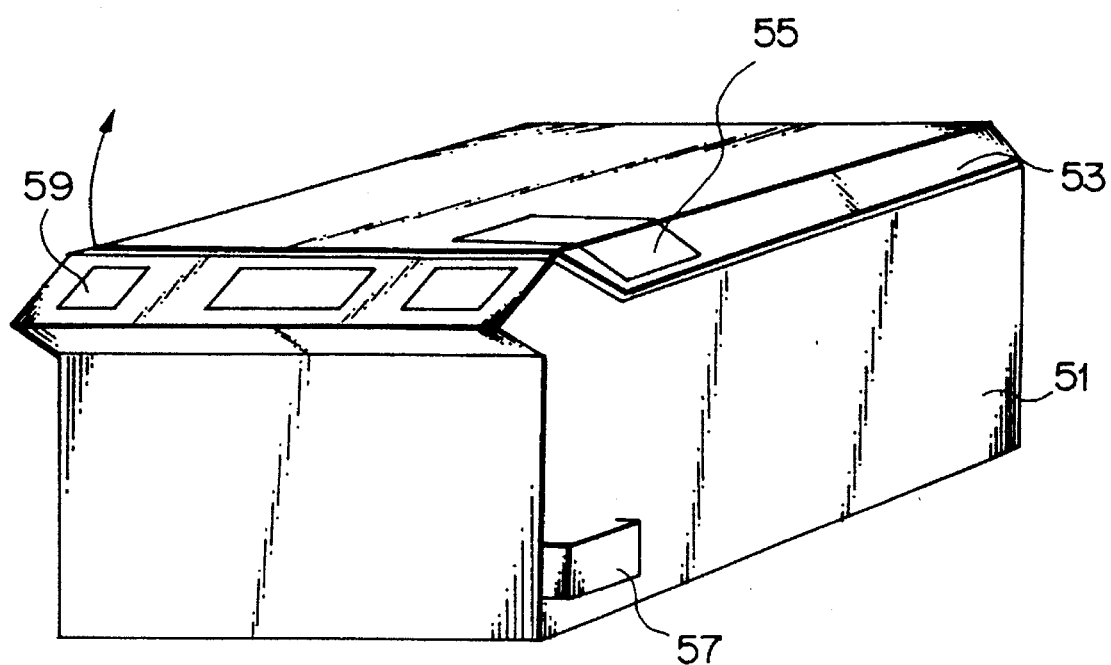
FIG. 19 is a perspective view showing the digital copier having a portion for accommodating the marker case of FIG. 18.

As shown in FIG. 19, the illustrative embodiment includes an operation panel 59 for allowing the operator to enter various functions relating to the image formation capable of registering colors. Color data and copying functions are stored in memory means. A specific operation of the embodiment is shown in FIG. 6. As shown, in the embodiment, before colors are registered (S33), copying functions are entered (S31).

Figure 7:
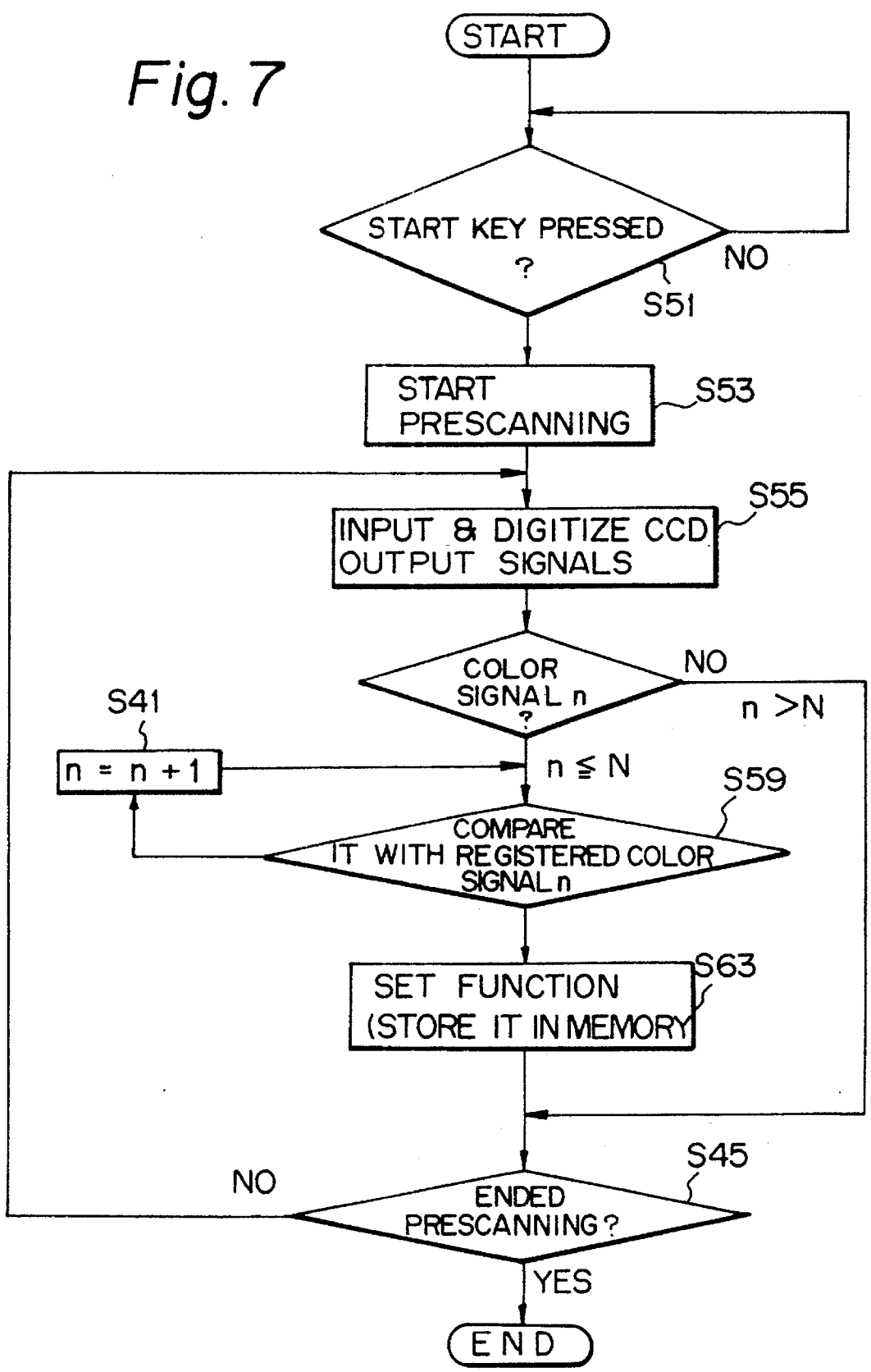
FIG. 7 is a flowchart representative of a procedure for selecting a function matching a detected color.

FIG. 7 shows how to select a function relating to image formation and associated with a detected color. Specifically, the flow chart of FIG. 7 shows a procedure for selecting a copying function. When prescanning begins in a step S53, a color signal associated with a document is compared with all the color signals corresponding to the registered copying functions (S57, S59, S41 and S63). If the color signal is identical with any one of the registered color signals, the associated copying function is set up and stored in the memory (S63). After the start of a copying operation, the processing stored in the memory is executed.

Figure 8:
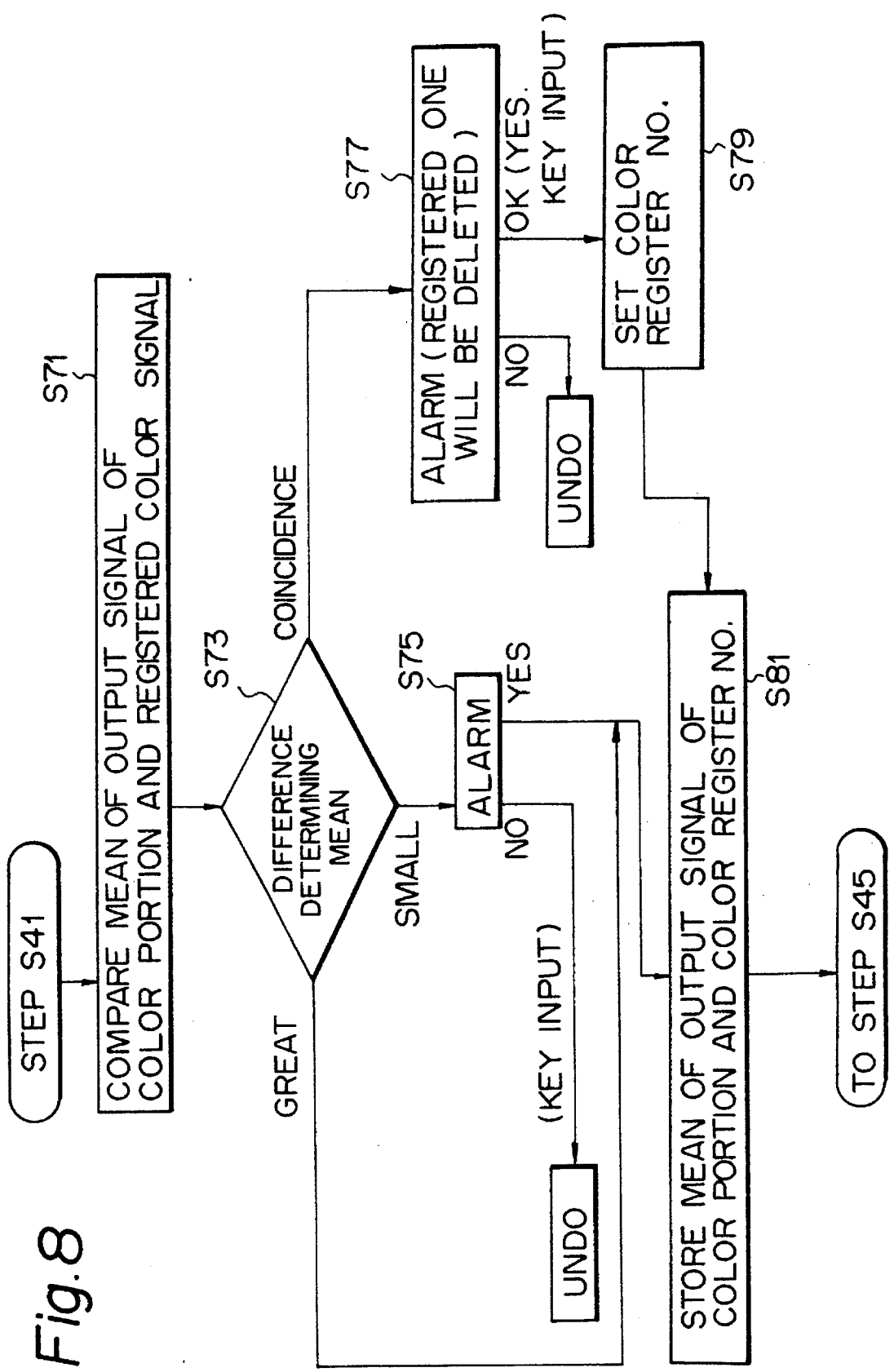
FIG. 8 is a flowchart representative of a procedure for producing an alarm when a difference between color signals is small.

FIG. 8 shows a procedure for displaying an alarm when the difference between the two color signals is small. In the figure, the word "UNDO" refers to cancelling all the registering operations and starting them again. If the difference of colors is small as determined in a step S73, an alarm message, e.g., "SIMILAR COLOR REGISTERED. REPLACE IT?" is displayed on the operation panel (S75) to avoid misdetection. If the two colors are entirely the same as determined in the step S73, an alarm message, e.g., "SAME COLOR REGISTERED. DELETE IT?" is displayed (S77). The program advances according to the operator's selection, i.e., YES/NO (S79 and S81).

Figure 9:
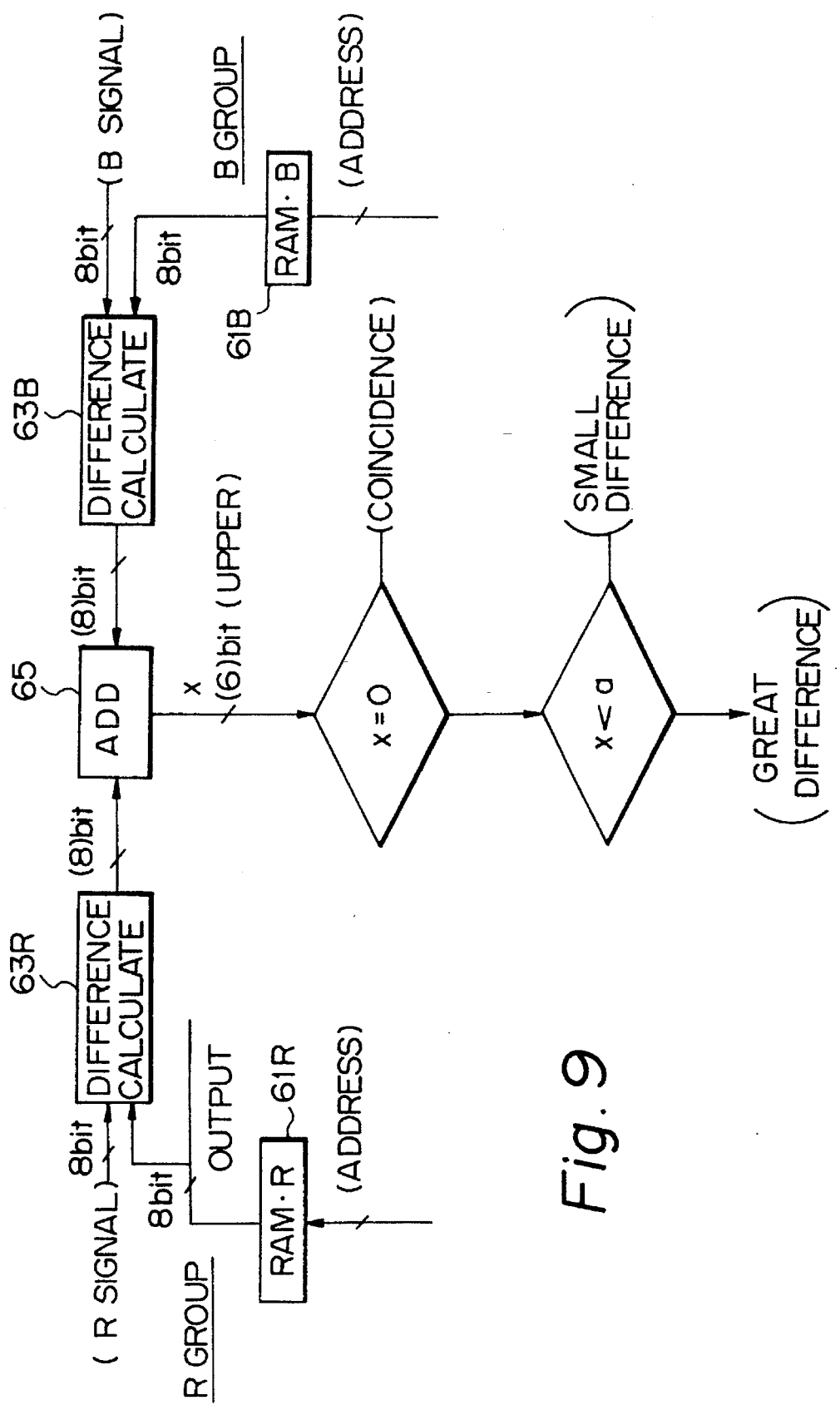
FIG. 9 is a block diagram schematically showing circuitry for determining the difference between color signals.

The procedure for determining the difference between color signals described above is shown in FIG. 9 specifically. While FIG. 9 pertains to two color signals R (red) and B (blue) shown in FIG. 1, the procedure is also true with the arrangement of FIG. 2 except that one additional signal line is needed. As shown, RAMs (Random Access Memories) 61R and 61B are respectively assigned to red and blue and store respective registered color signals. The color signals stored in the RAMS 61R and 61B are read out by address signals corresponding to their registered Nos. and respectively compared with an R signal and a B signal read out of a document by difference calculating sections 63R and 63B. The outputs of the calculating sections 63R and 63B, i.e., the differences are applied to an adder 65 as absolute values. The adder 65 adds the two difference signals. This part of the procedure is executed by using the maximum number of bits of the color signals. On the other hand, the output of the adder 65 appears with lower bits smaller than the maximum number of bits by one or two bits. This is to remove an error usually included in the lower one or two bits of a color signal due to the condition of a document and/or that of a scanner. If the output $\chi$ of the adder 65, i.e., upper bits are (logical) ZEROs, the color signal is determined to be identical with the registered color signal. If the value $\chi$ is smaller than a predetermined value $\alpha$, the color signal is is determined to be similar to the registered color signal, i.e., the color difference is determined to be small. The value $\alpha$, as well as the number of valid upper bits, is selected in consideration of the ability of the signal processing system including the scanner and the possible degree of irregular painting on documents.

As shown in FIG. 10, with the illustrative embodiment, it is also possible to select particular functions relating to image data as instructed by the leading edge of a document having been colored. In this case, the scanner performs prescanning only over a distance L of 1 mm from the leading edge of the document and then returns to a home position thereof, and then a copying operation begins. During the prescanning, characters written in colors in the leading edge of the document by hand are recognized (by any conventional scheme for the recognition of hand-written characters). This is followed by a copying operation with functions matching the recognized characters. In FIG. 10, a red character 71 and a blue character 73 indicate respectively a desired magnification (50%) and a desired number of copies (three). Further, when the 50% magnification and three-copy functions are assigned to green, the documents shown in FIG. 10 can be processed at the same time. It should be noted that even in this mode the color characters and marks each having a particular function are not reproduced on copies.

Figure 11:
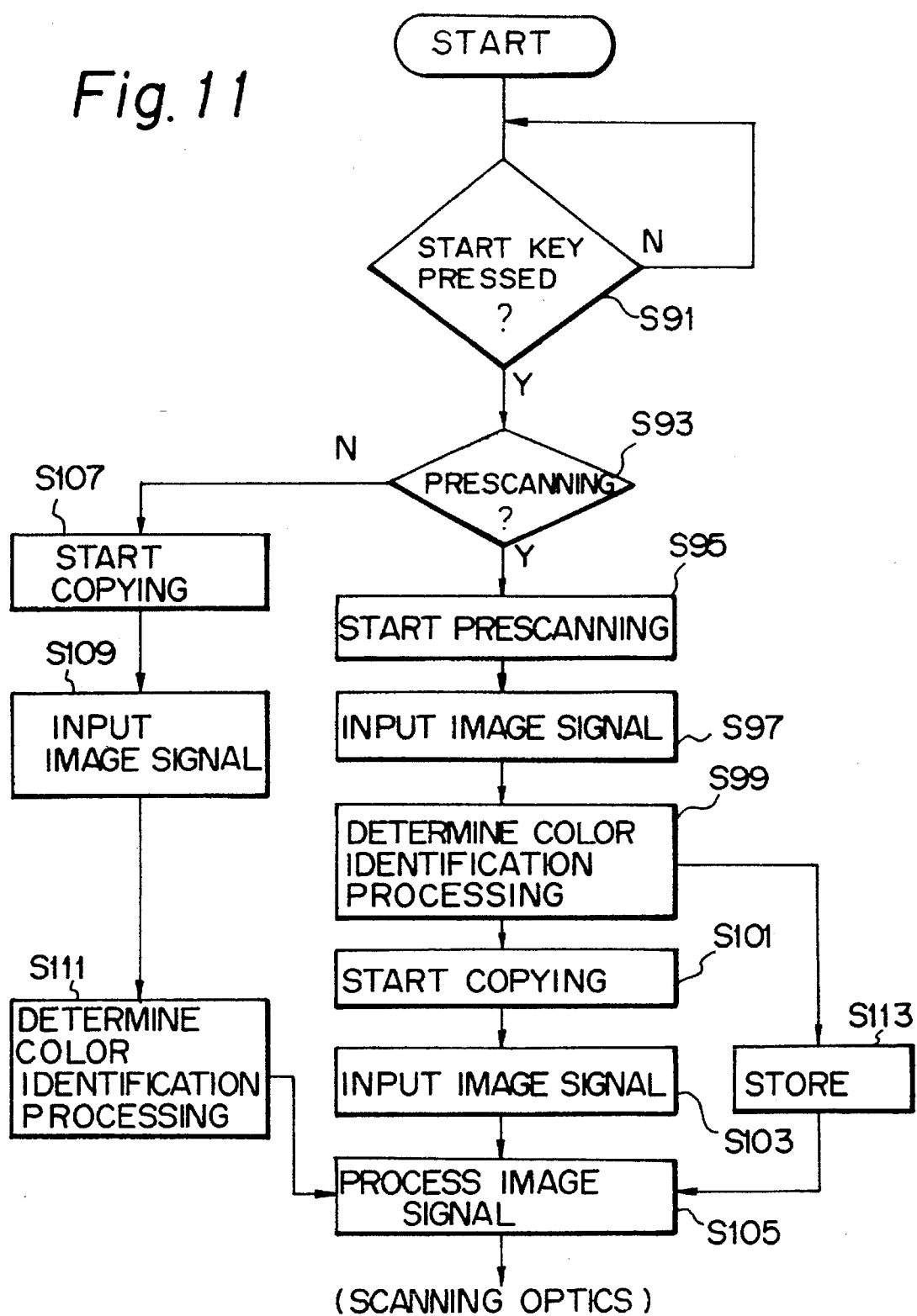
FIG. 11 is a flowchart indicative of an operation relating to prescanning.

FIG. 11 shows another specific procedure available with the embodiment. As shown, when the start key is pressed (S91), prescan decision means (S91) determines whether or not the registered functions copying with color discrimination include one which needs prescanning (e.g., cornering, centering, magnification change or copy number setting). Whether or not to effect prescanning is determined on the basis of the answer of the step S91.

FIGS. 12A–12D show specific functions assigned to colors on a mode basis, i.e., color discriminating functions which differ from one mode to another. The modes are an ordinary mode, a magnification change mode, a mesh mode, and an edge color discrimination mode each assigning particular functions to the colors.

Figure 13:
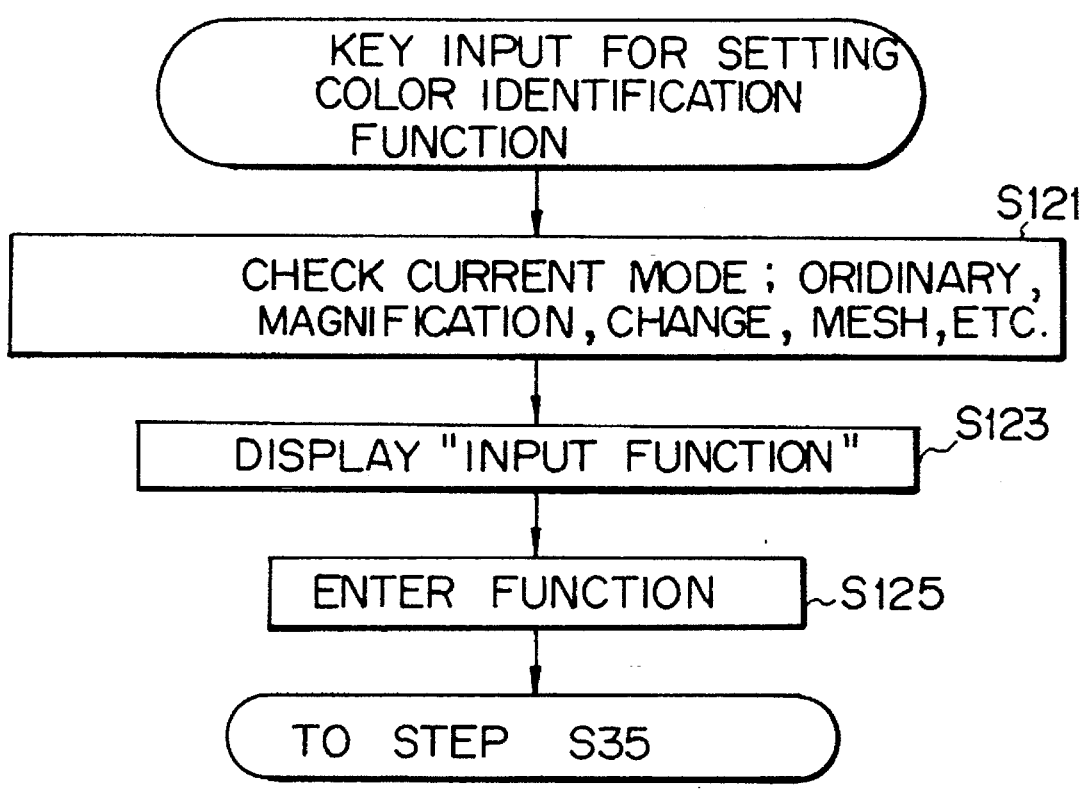
FIG. 13 is a flowchart indicative of a procedure to be executed when the functions assigned to each color are changed mode by mode.

FIG. 13 is representative of processing associated with the functions to be executed in any one of the modes shown in FIGS. 12A–12D. As shown, after the current mode has been determined (S121), a message urging the operator to enter a desired function, e.g., "INPUT FUNCTION" is displayed (S123). Then, the inputted function is entered (S125).

Figure 14:
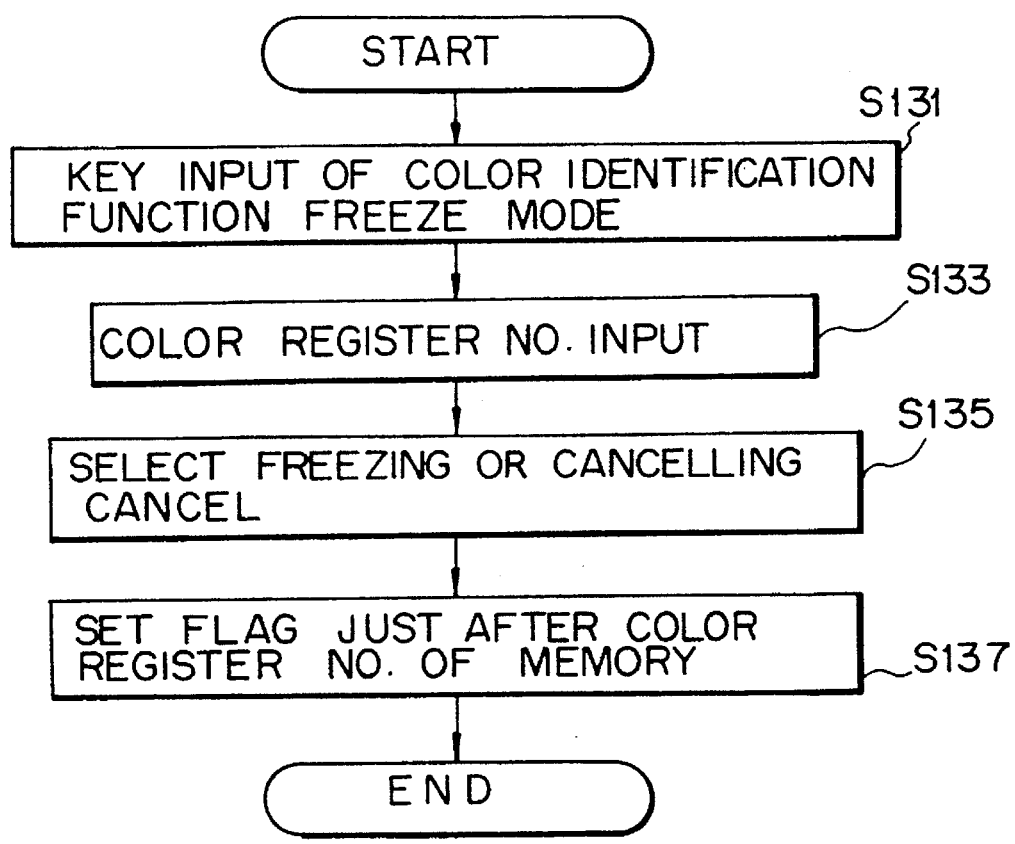
FIG. 14 is a flowchart representative of a procedure for freezing the processing shown in FIG. 5.
Figure 15:
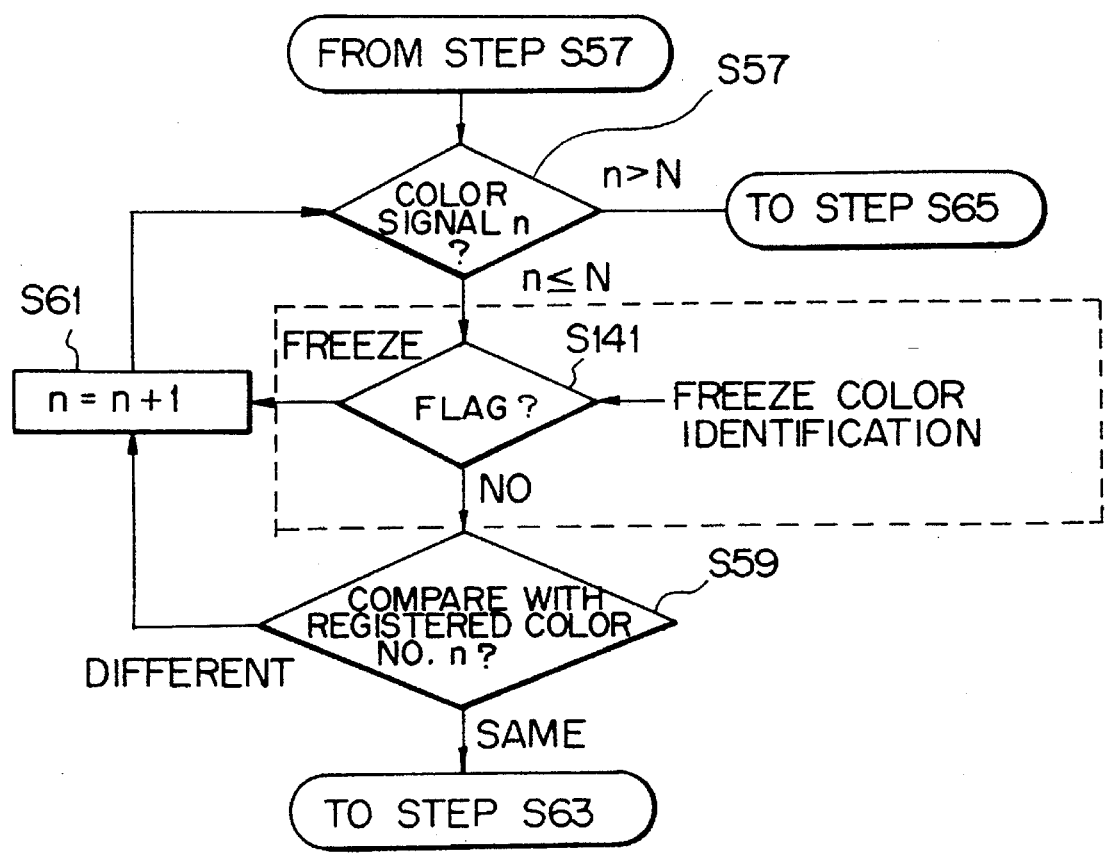
FIG. 15 is a flowchart associated with FIG. 14.

FIG. 14 shows processing to be executed for temporarily freezing the processing associated with the colors shown in FIG. 5. This processing allows a color document registered for color discrimination to be copied. Specifically, as the functions are temporarily frozen by the procedure (S131–S135), a flag is set (S137) to allow a copying operation to be performed without cancelling the registered functions. How a copying operation proceeds when the functions are frozen is shown in FIG. 15.

Figures 16, 17:
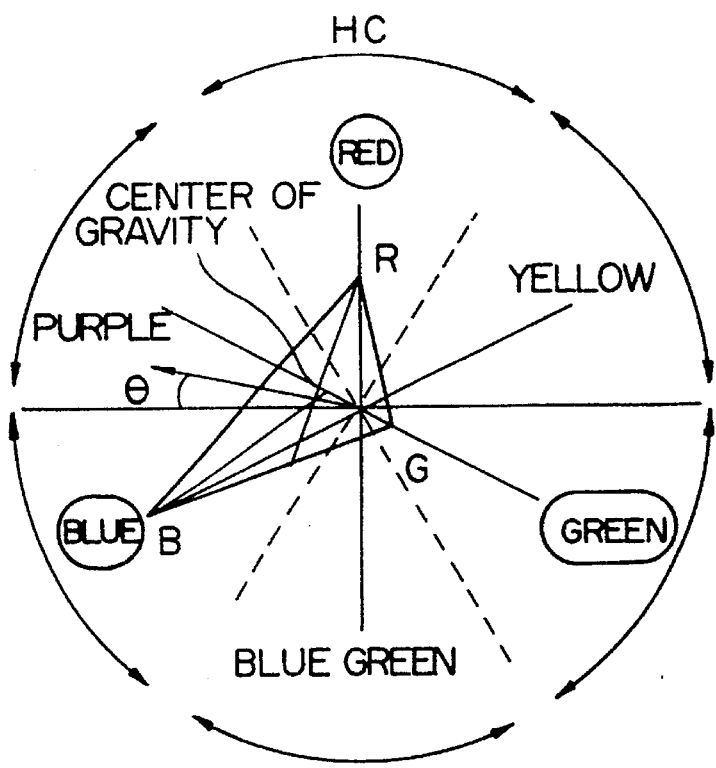
FIG. 16 is a chart representative of a method of determining a color name.
FIG. 17 shows a specific color name determined in FIG. 16 and processing assigned thereto.

FIG. 16 shows a specific method of determining a color name. The illustrative embodiment has the scanner capable of reading full color, means for determining a color name corresponding to the color signal, and a function of displaying the names of registered colors. The scanner reads full color and, therefore, outputs R, color signals R, G and B. Specific values of the color signals R, G and B are indicated by X. The method determines a color name by determining the center of gravity of the three points and then determining an angle θ of a vector extending from the center to the center of gravity. Regarding light/dark, the color is determined to be light if the sum of the signals R, G and B is greater than a predetermined value V0 or dark if the sum is smaller than another predetermined value V1. If desired, the color name may be determined by transforming R, G and B to L*a*b* coordinates on which a and b are representative of a color name and light/dark, respectively. However, the above-described method is more convenient and sufficient in practice. FIG. 17 shows a specific color name and a specific function associated therewith and to be displayed.

Figure 18:
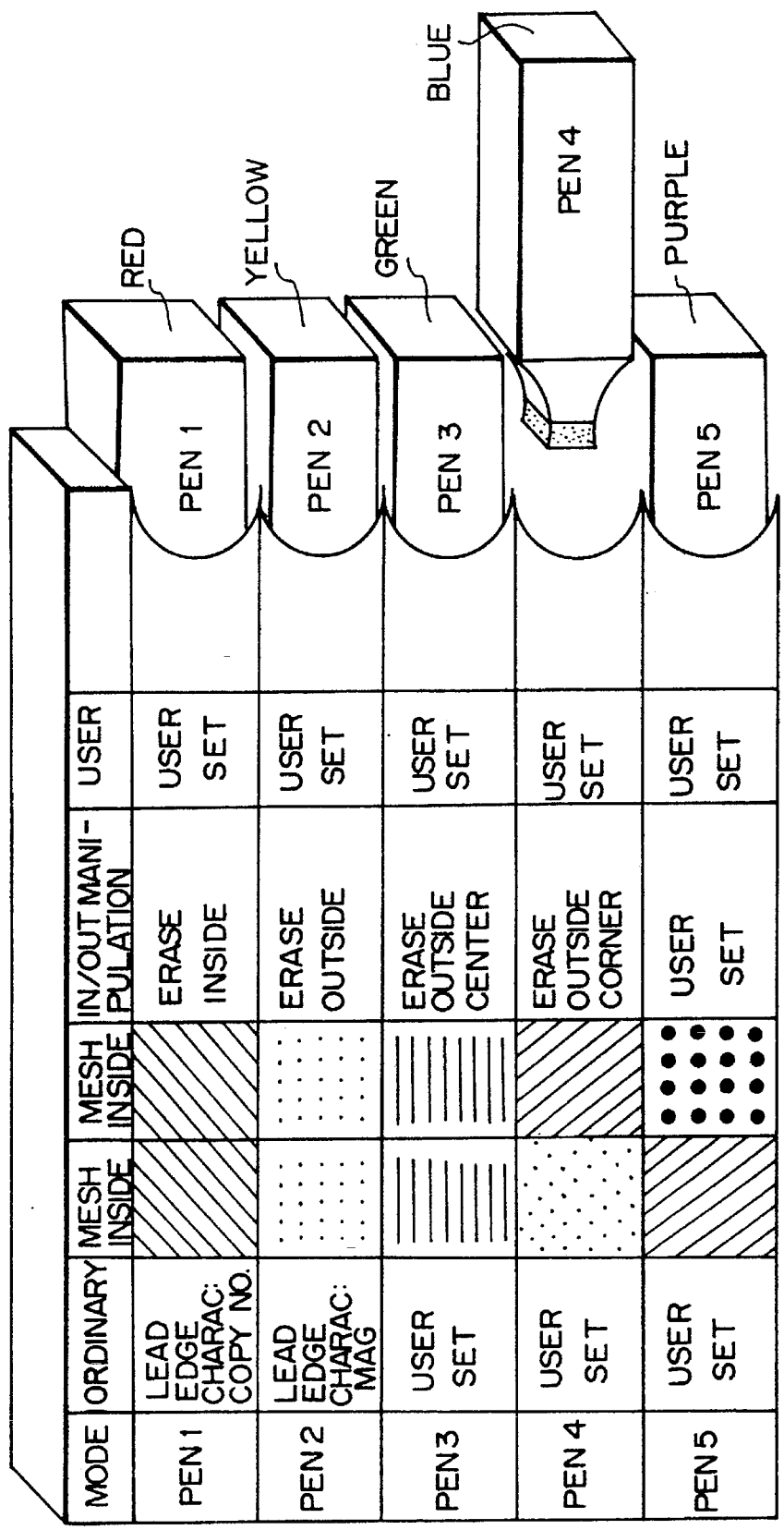
FIG. 18 is a perspective view of markers, or pens, for color discrimination and a case accommodating them.

A reference will be made to FIGS. 18 and 19 for describing markers in the form of pens for the discrimination of colors and a case accommodating the markers. As shown, a table indicating the correspondence of the marker holding portions of the case and the respective functions is printed on the outside of the case, so that the operator may see it easily. Specifically, in the embodiment, the markers are sequentially arranged in the mode column direction, and minute functions are drawn at the intersecting portions of the matrix. The user set portions allows the user to newly register or add desired functions afterwards. The functions are indicated color by color, and the markers are held in positions associated with the functions. As shown in FIG. 19, the case may be accommodated in a portion 55 formed in a cover plate 53 that covers the glass platen, such that the front of the case is as easy to see as a display 59. Alternatively, the case may be accommodated in a portion 57 formed on one side 51 of the copier.

In the embodiment, characters or similar images are assumed to be printed in black ink on a document, or so-called copy sheet. However, the present invention is practicable with any desired color, including black and white, or coloring material. The gist is that colors can be identified with no regard to the color of sheets.

Further, the copy sheets or other papers are merely a specific form of recording medium and may be replaced with sheets or plates made of resin.

In summary, it will be seen that the present invention provides an image forming apparatus capable of executing particular ones of registered functions relating to image formation and matching colors entered on a document and identified. This implements a plurality of kinds of mark processing and functions only if a plurality of marks are entered on a document by markers. In addition, the apparatus allows any desired colors to be registered thereat, i.e., accommodates any kind of markers.

When the operator desires to register a new color at the apparatus, the apparatus produces an alarm if the difference between a signal representative of the new color and a signal representative of a registered color is small. The user, therefore, does not have to recall whether or not the user used a similar color in the past. Further, if the difference between the two color signals is smaller than a predetermined value, the operator or a CPU selects one of the new color and registered color on the basis of a predetermined reference. In the event of image formation, a color entered on the leading edge of a document is identified. This reduces the required prescanning stroke and, therefore, produces the first copy rapidly. Moreover, by marking a particular area, character recognition is facilitated.

The apparatus allows desired colors and functions associated with whether or not to effect prescanning to be registered in correspondence with each other. As a result, needless prescanning is eliminated to produce the first copy rapidly.

The apparatus allows desired colors and functions relating to image formation to be registered thereat in matching relation and mode by mode. Hence, the functions can be selected on a mode basis. It follows that a plurality of functions can be assigned to a single color, making it needless to use a number of colors.

Moreover, in the event of ordinary reproduction of a color document, functions registered in matching relation to colors can be restricted. When the restriction is cancelled, the functions are automatically set up again.

Various modifications will become possible for those skilled in the art after receiving the teachings of the present disclosure without departing from the scope thereof.

What is claimed is:

1. An image forming apparatus comprising:

a reading section for optically reading a document;

an image forming section for forming an image representative of the document read by said reading section on an image carrier in response to image data;

a storing section for storing desired colors and functions associated with said colors and relating to image formation;

an identifying section for identifying a color entered on the document in response to the image data; and a control section for executing any of the functions stored in said storing section and matching the color determined by said identifying section, wherein said image forming apparatus has a color register mode in which an operator can register one of said desired colors and assign one of said functions to said one of said desired colors by sequentially setting said one of said functions, pressing a color register key, marking a sheet having a background color in said one of said desired colors, and pressing a copy start key, and wherein, when said color register mode has been selected, said reading section scans the sheet and outputs a corresponding output signal, said identifying section identifies said background color of said sheet and then identifies said one of said desired colors, and the storing section writes each of a mean of the output signal of said reading section corresponding to said one of said desired colors, a color register number, and said one of said functions in memory.

2. An apparatus as claimed in claim 1, further comprising:

deciding circuitry for determining, when a color is to be newly stored in said storing section, a difference between a color signal representative of said color and a color signal representative of the stored color; and an alarming section for producing an alarm when the difference between the two color signals determined by said deciding circuitry is not greater than a predetermined value.

3. An apparatus as claimed in claim 2, further comprising a selecting section for selecting, when the difference between the color signals determined by said deciding circuitry is not greater than said predetermined value, either of the color to be newly stored and the stored color.

4. An apparatus as claimed in claim 1, wherein said identifying section identifies, in the event of image formation by said image forming section, a color entered on a leading edge of the document when said document is read by said reading section.

5. An apparatus as claimed in claim 1, wherein said storing section stores the desired colors and functions relating to control associated with whether or not to effect prescanning in the event of image formation is to be executed, in matching relation to each other.

6. An apparatus as claimed in claim 1, further comprising a restricting section for restricting said control section from executing any of the functions stored in said storing section.

7. An image forming apparatus comprising:

a mode setting section for setting a mode associated with various functions relating to image formation;

a reading section for optically reading a document;

an image forming section for forming an image representative of the document read by said reading section on a recording medium in response to image data and in the mode set by said mode setting section;

a storing section for storing, for each of the modes set by said mode setting section, desired colors and functions relating to image formation and corresponding to said desired colors;

an identifying section for identifying a color entered on a document in response to image data generated by said reading section; and a control section for executing the functions stored in said storing means in matching relation to the color identified by said identifying section and the mode set by said mode setting section, wherein said mode setting section sets a color register mode, in which one of said desired colors is registered and one of said functions is assigned to said one of said desired colors, when an operator sequentially sets said one of said functions, presses a color register key, marks a sheet having a background color in said one of said desired colors, and presses a copy start key, and wherein, when said color register mode has been set, said reading section scans the sheet and outputs corresponding image data, said identifying section identifies said background color of said sheet and then identifies said one of said desired colors, and the storing section writes each of a mean of the image data generated by said reading section corresponding to said one of said desired colors, a color register number, and said one of said functions in memory.

8. An apparatus as claimed in claim 7, further comprising a restricting section for restricting said control section from executing any of the functions stored in the stored section.

9. A method for forming an image comprising the steps of:

optically reading a document;

forming an image representative of the document on an image carrier in response to image data;

storing desired colors and functions associated with said colors and relating to image formation;

identifying a color entered on the document in response to the image data;

executing any of the functions stored in said storing step and matching the color determined by said identifying;

determining, when a color is to be newly stored in said storing step, a difference between a color signal representative of said color and a color signal representative of the stored color;

producing an alarm when the difference between the two color signals determined by said determining step is not greater than a predetermined value;

executing a color register mode in which an operator can register one of said desired colors and assign one of said functions to said one of said desired colors by sequentially setting said one of said functions, pressing a color register key, marking a sheet having a background color in said one of said desired colors, and pressing a copy start key, and wherein, when said color register mode has been selected, said method scans the sheet and outputs a corresponding output signal, identifies said background color of said sheet and then identifies said one of said desired colors, and writes each of a mean of the output signal of said reading section corresponding to said one of said desired colors, a color register number, and said one of said functions in memory.

10. A method of registering a desired color in an image forming apparatus and assigning a function to said desired color when an operator sets said function, presses a color register key, marks a sheet having a background color in said desired color, and presses a copy start key, comprising the sequential steps of:

scanning the sheet and outputting a corresponding output signal;

identifying said background color of said sheet;

identifying said one of said desired colors;

determining the difference between a mean of the output signal corresponding to the desired color and the previously registered colors;

displaying an alarm when there is no difference or the difference is less than a predetermined value; and storing each of said mean of the output signal corresponding to said one of said desired colors, a color register number, and said one of said functions in memory when the difference is greater than said predetermined value.

* * * * *